(12) United States Patent
Arseneault et al.

(10) Patent No.: US 7,729,274 B2
(45) Date of Patent: Jun. 1, 2010

(54) SMART ETHERNET MESH EDGE DEVICE

(75) Inventors: Jim Arseneault, Woodlawn (CA); Brian Smith, Ottawa (CA); Ken Young, Kanata (CA)

(73) Assignee: Ciena Corporation, Linthicum, MD (US)

( * ) Notice: Subject to any disclaimer, the term of this patent is extended or adjusted under 35 U.S.C. 154(b) by 800 days.

(21) Appl. No.: 11/495,479

(22) Filed: Jul. 28, 2006

(65) Prior Publication Data

US 2007/0230427 A1 Oct. 4, 2007

Related U.S. Application Data

(60) Provisional application No. 60/788,390, filed on Mar. 31, 2006, provisional application No. 60/796,492, filed on May 1, 2006.

(51) Int. Cl.
*H04J 1/16* (2006.01)
*H04B 7/216* (2006.01)

(52) U.S. Cl. .................. 370/252; 370/329; 370/386; 370/401

(58) Field of Classification Search .............. 370/328, 370/329, 310.1, 369, 386, 252, 401; 455/556.1
See application file for complete search history.

(56) References Cited

U.S. PATENT DOCUMENTS

| 5,859,837 | A | 1/1999 | Crayford |
|---|---|---|---|
| 2002/0181396 | A1 | 12/2002 | Chen et al. |
| 2003/0058880 | A1 | 3/2003 | Sarkinen et al. |
| 2003/0063560 | A1 | 4/2003 | Jenq et al. |
| 2003/0133406 | A1 | 7/2003 | Fawaz et al. |
| 2003/0147347 | A1 | 8/2003 | Chen et al. |
| 2003/0156542 | A1 | 8/2003 | Connor |
| 2004/0037223 | A1 | 2/2004 | Harrison et al. |
| 2004/0081090 | A1 | 4/2004 | Hara et al. |
| 2004/0151181 | A1 | 8/2004 | Chu et al. |
| 2004/0156345 | A1 | 8/2004 | Steer et al. |
| 2004/0203815 | A1* | 10/2004 | Shoemake et al. .......... 455/450 |
| 2005/0008014 | A1 | 1/2005 | Mitra et al. |
| 2005/0089052 | A1 | 4/2005 | Chen et al. |
| 2005/0141523 | A1 | 6/2005 | Yeh et al. |
| 2005/0220096 | A1 | 6/2005 | Friskney et al. |
| 2005/0152269 | A1 | 7/2005 | Liu |
| 2005/0243711 | A1 | 11/2005 | Alicherry et al. |
| 2005/0259611 | A1 | 11/2005 | Bhagwat et al. |
| 2006/0099972 | A1 | 5/2006 | Nair et al. |
| 2009/0036159 | A1* | 2/2009 | Chen ........................ 455/556.1 |

OTHER PUBLICATIONS

PCT International Search Report for International Application No. PCT/IB2007/000855 dated Feb. 8, 2008.

* cited by examiner

*Primary Examiner*—John Pezzlo
(74) *Attorney, Agent, or Firm*—Clements Bernard PLLC; Christopher L. Bernard; Tyler S. Brown

(57) ABSTRACT

A system is provided for making connections in a telecommunications system that includes a network for transporting communications between selected subscriber connections, and a wireless network for coupling connections to the network. The network and wireless network are interfaced with a traffic management element and at least one radio controller shared by connections, with the traffic management element and the radio controller forming a single integrated network element. Connections are routed from the wireless network to the network via the single integrated network element.

3 Claims, 5 Drawing Sheets

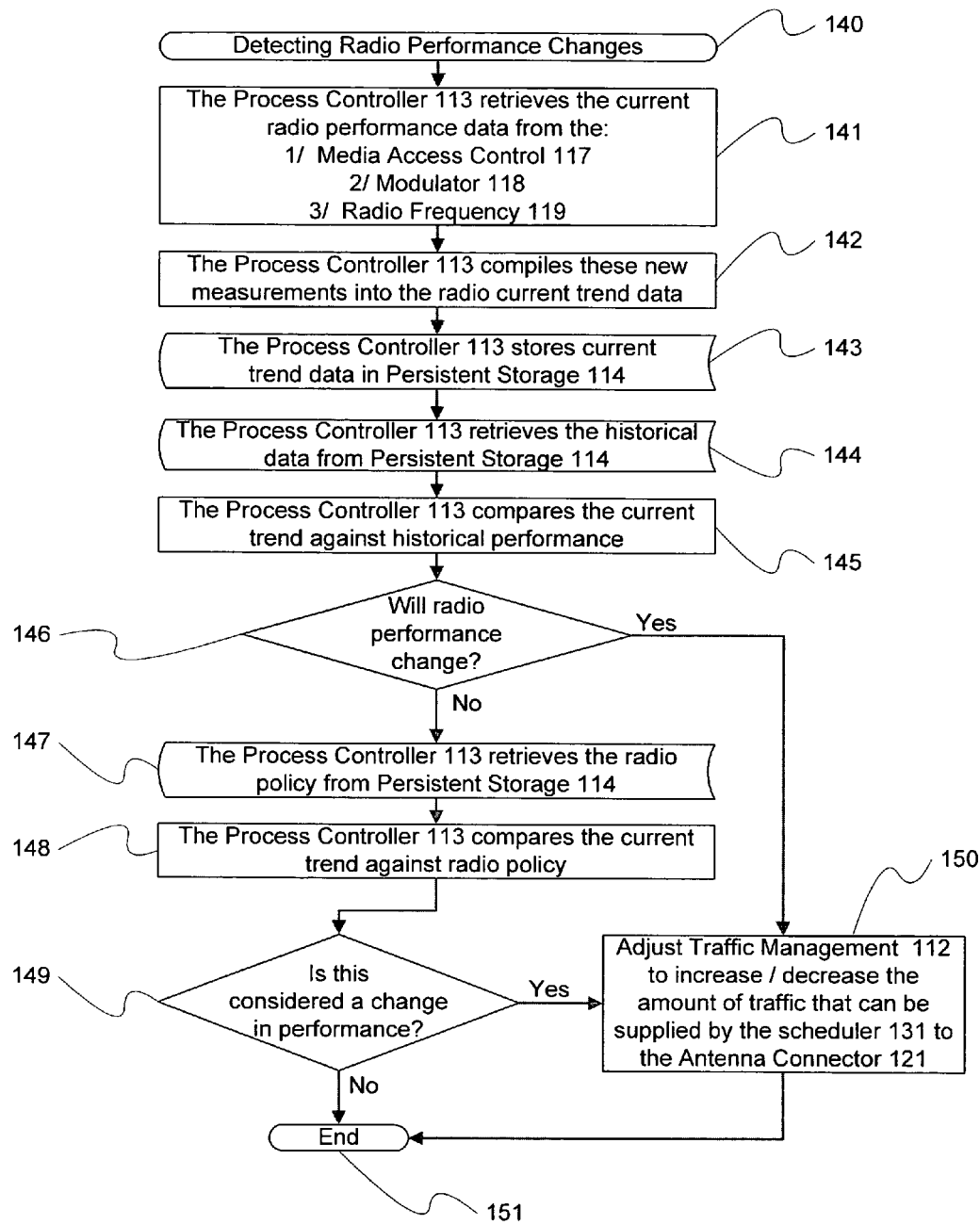

SMART ETHERNET MESH EDGE DEVICE

CROSS-REFERENCE TO RELATED APPLICATIONS

This application claims priority to U.S. Provisional Application Ser. No. 60/788,390 filed Mar. 31, 2006 and U.S. Provisional Application Ser. No. 60/796,492 filed May 1, 2006.

FIELD OF THE INVENTION

The present invention generally relates to Ethernet access and, in particular, to bandwidth efficient Ethernet grid networking systems.

BACKGROUND OF THE INVENTION

Ethernet is rapidly becoming the protocol of choice for consumer, enterprise and carrier networks. It is expected that most networks will evolve such that Ethernet will be the technology used to transport all the multimedia applications including, for example, triple-play, fixed-mobile-convergence (FMC), and IP multimedia sub-systems (IMS). Existing network elements which offer network access using Ethernet technology are not designed to make maximum use of the legacy network links existing at the edge of the carrier networks. The edge of the network is quickly becoming a bottleneck as the new applications are becoming more and more demanding for bandwidth.

Telecommunications carriers are constantly looking for new revenue sources. They need to be able to deploy rapidly a wide ranging variety of services and applications without the need to constantly modify the network infrastructure. Ethernet is a promising technology that is able to support a variety of application requiring different quality of service (QoS) from the network. The technology is now being standardized to offer different types of services which have different combinations of quality objectives, such as loss, delay and bandwidth. Bandwidth objectives are defined in terms of committed information rate (CIR) or excess information rate (EIR). The CIR guarantees bandwidth to a connection, while the EIR allows operation at higher bandwidth when available.

RF Switch

In order to increase their revenue potential, the carriers need a cost effective way to reach new customers which cannot currently serviced because there is no practical way of providing them with a broadband physical connection. New high bandwidth wireless technology, such as WiMAX or high speed RF technology allows the carrier to reach a new customer or a customer that is not currently serviced with high bandwidth without the high cost of deploying new fiber routes. The following description uses Wimax as an example, but any point-to-point RF technology could be used. By deploying WiMAX at the access of the network, the carriers can rapidly open up new markets. However, currently the Ethernet access solutions using WiMAX technology are costly, from both operating cost (OPEX) and capital cost (CAPEX) standpoints, as each access point requires a combination of a WiMAX base-station 10 with a router 11 (FIG. 1). Although WiMAX operates at higher speed, it is still important to maximize the use of its bandwidth since spectrum is a limited resource. But because the (WiMAX radio 105 and the router 102) are separate, the router has no knowledge of the radio status, it is difficult to make maximum use of the wireless bandwidth. WiMAX currently allows for multiple users to share a base station. If a subscriber does not reach the base station directly, it can tunnel through another subscriber which has connectivity. This architecture allows multiple subscribers to reach a base station which is connected to the wired network. One major issue with this architecture is that the bandwidth consumed by the tunneled subscriber is not managed and can affect the bandwidth and QoS of the service of the subscriber which is sharing the connectivity to the base station. Such architecture, which limits the subscribers to being not farther than two hops from the base station, is targeted for residential customers with less stringent QoS requirements. It is not well suited for designing enterprise networks or carrier infrastructure.

Anticipating Radio Link Performance Changes

Compared to optical transmission, wireless links are regularly subjected to impairments due to weather or other interferences. These impairments temporarily affect the bandwidth transmitted on the link. Since the base station 105 (FIG. 1) is temporarily decoupled from the switching network, there is no mechanism for the network elements to take into account link degradation and to manage the flow of data on the network. This will typically result in a large amount of packets being dropped at the WiMAX radio 105 as the Switch/Router 102 only knows if the Ethernet connector 103 is up or down and will send more packets than the radio can handle.

SUMMARY OF THE INVENTION

One embodiment of this invention provides a system for making connections in a telecommunications system that includes a network for transporting communications between selected subscriber connections, and a wireless network for coupling connections to the network. The network and wireless network are interfaced with a traffic management element and at least one radio controller shared by connections, with the traffic management element and the radio controller forming a single integrated network element. Connections are routed from the wireless network to the network via the single integrated network element.

BRIEF DESCRIPTION OF THE DRAWINGS

The invention will be better understood from the following description of preferred embodiments together with reference to the accompanying drawings, in which:

FIG. 5 illustrates a radio impairment detection mechanism.

DETAILED DESCRIPTION

RF Switch

Figure 1:
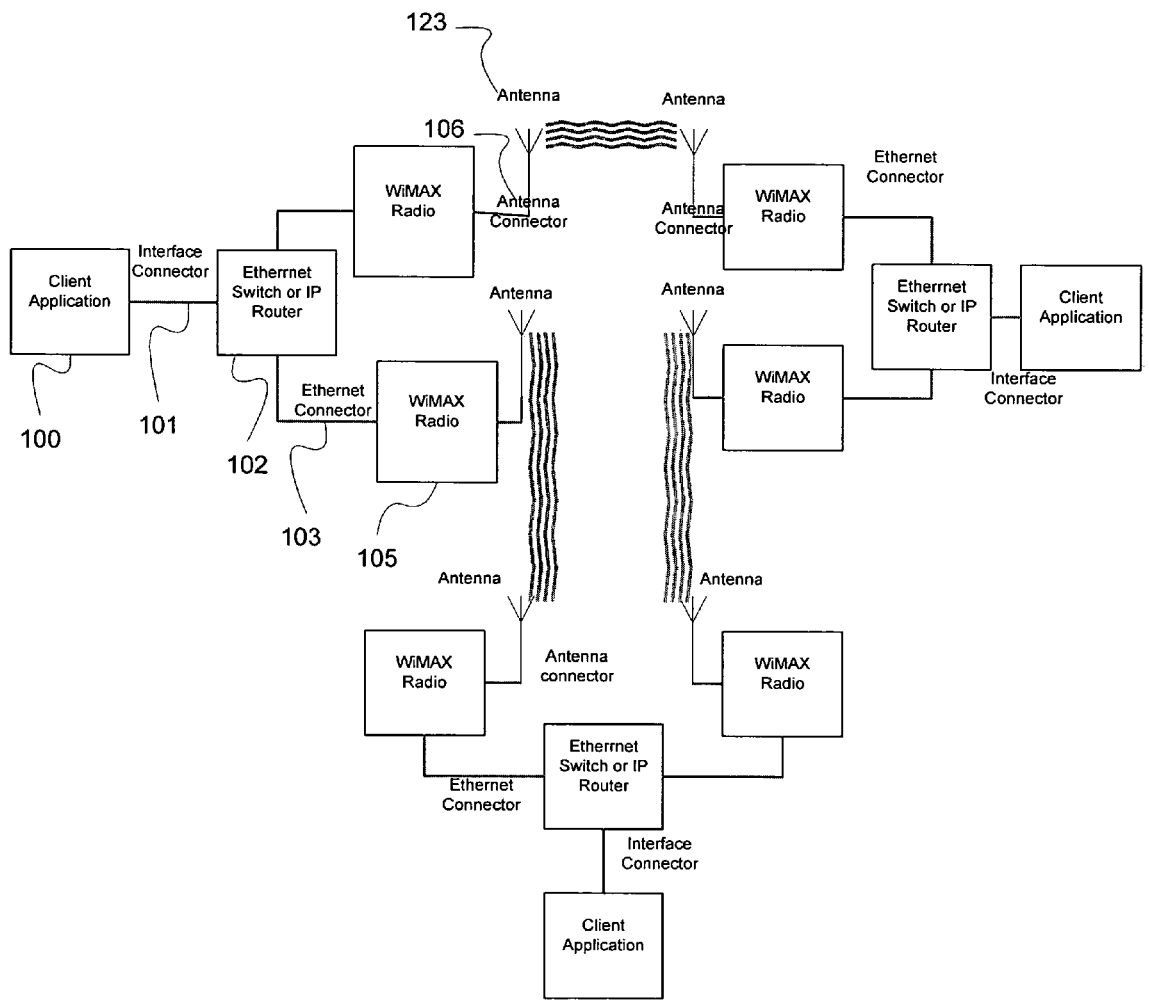
FIG. 1 is a diagram illustrating existing network architecture with separate WiMAX base station and routers.

Existing Ethernet over WiMAX solutions as illustrated in FIG. 1 require a separate packet switch 10 such as an Ethernet switch, MPLS switch or router to switch traffic between WiMAX radios 105 and client interfaces 100. The WiMAX (or other point-to-point RF) radio 105 connects Ethernet from the Ethernet switch or IP router 102 and converts it into the WiMAX standard, then transmitted over a antenna connector 106, then to the antenna 123, and then over the airways to the receiving antenna. Integrating the switching and WiMAX radio functions reduces operational costs and improves monitoring and control of WiMAX radios.

Figure 2:
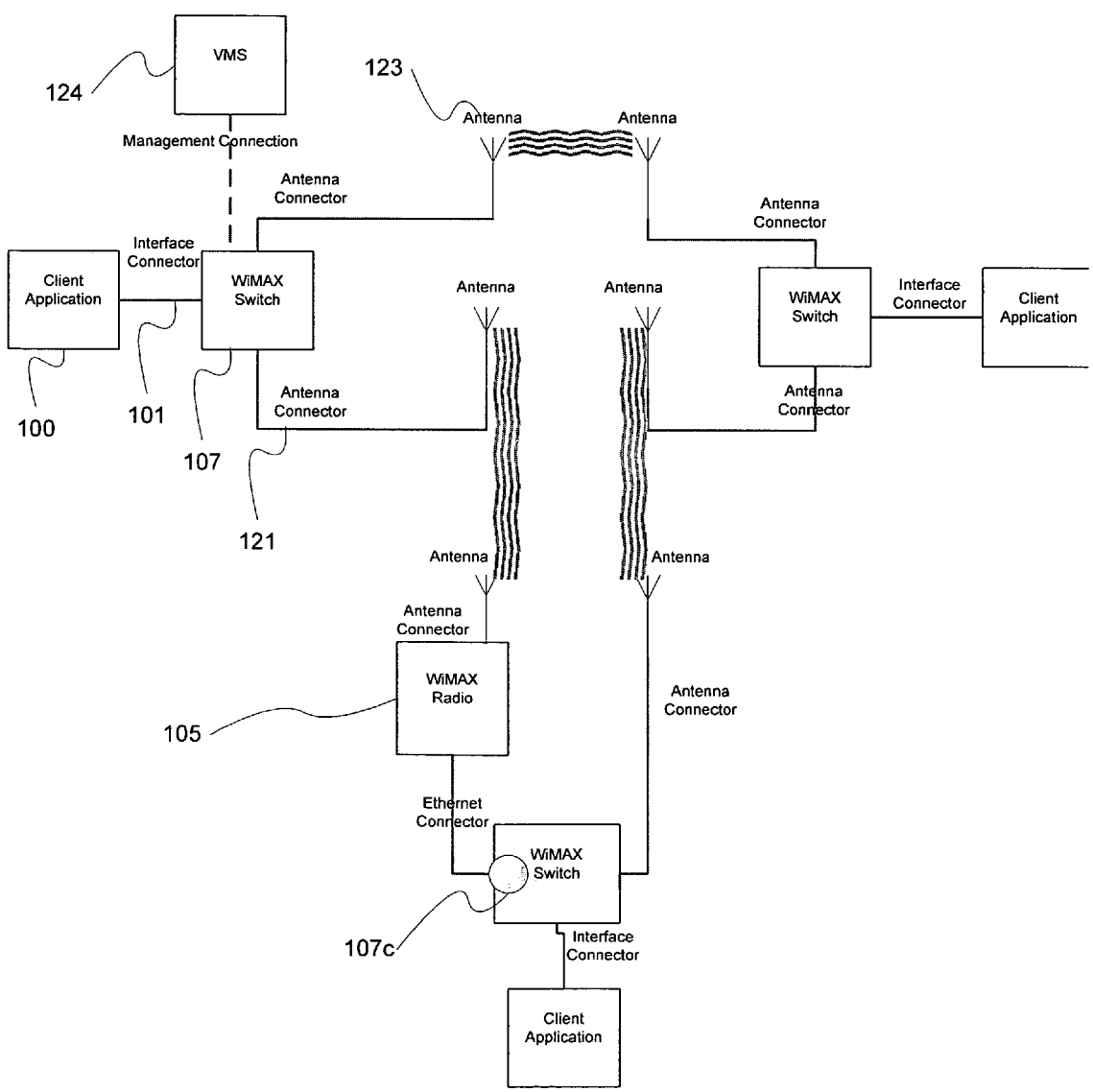
FIG. 2 illustrates an integrated network element containing a WiMAX base station with an Ethernet switch networked and managed with a VMS

Integration of the switching of service traffic among WiMAX radio links and access interfaces into a single network element, which is referred to as a WiMAX switch 107, is depicted in FIG. 2. The switching can be accomplished by using Ethernet switching, MPLS label switching or routing technology. One embodiment integrates only the control 107c of the radio with an external radio controller with the switching function to prevent loosing packets between the switch and the radio controller when the radio bandwidth degrades. In this model, the external radio controller provides periodical information about the status of the wireless link and thus acts as an integrated radio controller. The client application 100, connects to the switch 107 based on the service interface type 101 and is switched to the appropriate antenna connector 121 then to the antenna 123. The configuration of the switch is done by a management device called the VMS 124.

Figure 3:
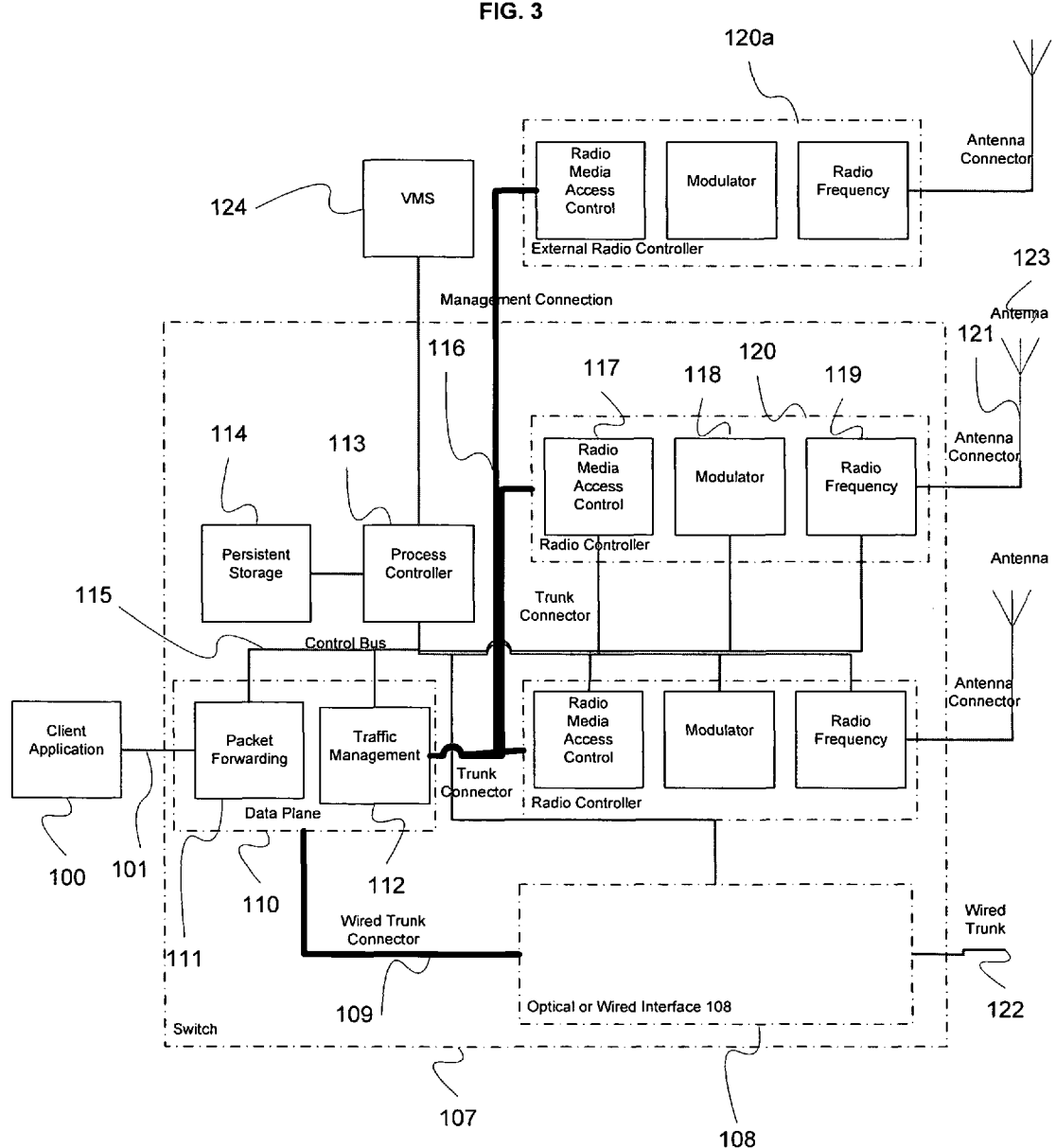
FIG. 3 illustrates one implementation for performing the switching in the WiMAX switch in the integrated network element of FIG. 2.

FIG. 3 provides an example of an implementation for the switching. The network element 107 includes one or more radio controllers 120 or external radio controllers 120a fully within the control of the network element and it can add/drop traffic to/from different types of interfaces 101 including but not limited to any number of Ethernet, ATM or T1/E1 interfaces. Different types of network trunks can also be added using optical links or other types of high speed links 122. The packet forwarding is connection-oriented and can be done using simple labels such as multi-protocol label switching (MPLS) labels, Ethernet VLAN-ID or 802.16 connection ID (CID) labels. Connections are established by a traffic engineering element referred to as the value management system (VMS) 124, which is a network management system. The VMS manages all the connections such that the QoS and path protection requirements are met.

Figure 4:
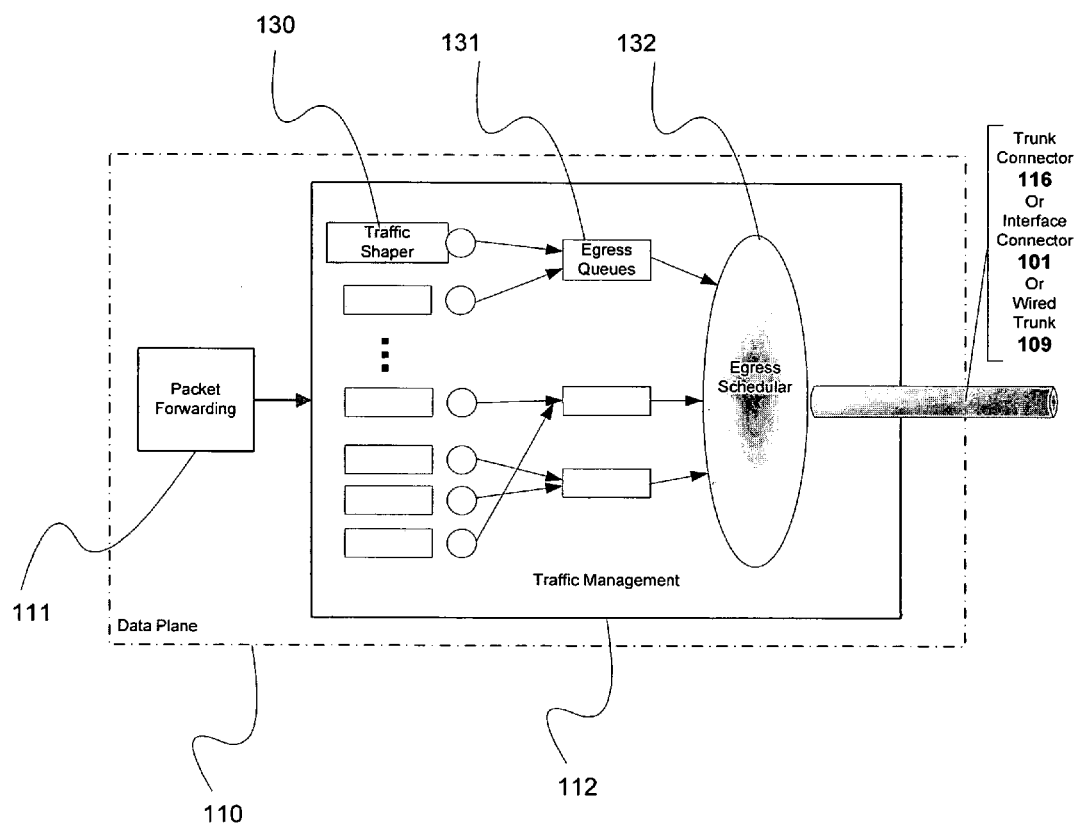
FIG. 4 illustrates a logical view of the traffic management bloc.

The WiMAX switch includes amongst other components, a data plane 110, which includes packet forwarding 111 and traffic management 112. The packet forwarding, 111 receives packets and performs classification to select which interface 101, trunk connector 116 or wired trunk connector, 109 to queue the packet. The traffic management 112 manages all the queues and the scheduling. It can also implement traffic shaping and flow control. The network and link configurations are sent to the Process controller 113 and stored in persistent storage 114. The Process controller configures the Packet Forwarding 111, the Traffic Management 112 and the Radio Controller 120 using the Control Bus 115. One logical implementation is shown in FIG. 4. There is one traffic shaper 130 per connection. The traffic shaper can be optionally set up to react to flow control information from the network. The scheduler 132 is responsible for selecting which packet to transmit next from any of the connections that are ready to send on the outgoing connector (NNI, UNI or Trunk). Intermediate queues 131 can be optionally used to store shaped packets that are awaiting transmission on the link. These queues can be subject to congestion and can implement flow control notification.

The radio controller is monitored via the process controller to be immediately notified of its state and operating speed.

Using a WiMAX switch, a grid network topology can be implemented which permits the optimized use of the bandwidth as each subscriber's traffic is controlled from end-to-end. This topology alleviates the need for subscribers to tunnel through another subscriber and therefore removes the one-hop limitation.

Anticipating Radio Link Performance Changes

In one embodiment, the radio is integrated with the switching layer (FIG. 3). Since the two elements are integrated within the same system, the radio status information is conveyed on a regular basis to the process controller 113 which can evaluate impending degradation of the link and take proactive actions, such as priority discards, flow control, protection switching etc. The objective is to avoid loss between the traffic management 112 and the radio controller 120 when the link speed is reduced due to performance degradations.

The scheduler 132 as seen in FIG. 4 matches any change in throughput as a result of expected changing transmission speeds (e.g. drop from QAM 64 to QAM 16). One algorithm that estimates the link performance is as follows:

1. If the link performance is impaired, the scheduler 132 limits the rate of traffic forwarded to the radio controller 120 and buffers this traffic as necessary in queues 131 or 130 (FIG. 4).
2. If the link performance is improved, the scheduler 132 increases the rate of traffic forwarded to the radio controller 120 and draining the traffic buffered in queues 131 or 130 (FIG. 4).

The radio controller 120 is responsible to commute traffic between the trunk connector 116 and the antenna connector 121. The process includes 3 functions:

3. A radio media access controller 117 which controls how packets are transmitted over the radio. It performs access control and negotiation for transmission of packets.
4. A modulator 118 which prepares packets for transmission over the air. It converts packets into a set of symbols to be transmitted over the air. It also mitigates the "over-the-air" impairments.
5. A RF amplifier which takes the modulated symbols and passes these to the antenna 123 over the antenna connector 121.

An example algorithm to anticipate radio link performance is shown in FIG. 5. In this example, the process controller 113 is responsible for handling the detection of radio performance 140. It starts by retrieving 141 performance statistics from elements in the radio controller 120. The process controller 113 needs to look at data from the media access controller 117 which includes radio grant times, retransmissions, packet drops, etc. From the modulator 118, the process controller retrieves the overall performance of the transmission of symbols across the air interface. The process controller 113 also looks at the RF layer 119 to look at the current signal to noise ratio and other radio parameters. Changes in these levels can indicate changes in modulation are required.

Once the process controller 113 has the current performance data, it is processed to produce the current trend data 142. Examples of these trends can be:

1. average rate of retransmission. When the measure reaches a particular threshold for a period of time, it can indicate drop in the RF modem rate is required to increase reliability.
2. RF noise floor level has raised itself for a period of time.

Once the trends have been calculated 143, the process controller 113 stores this in persistent storage 114. The process controller then retrieves the historical data 144 and compares the current trends to the historical trends 145.

Based upon this comparison, the process controller 113 decides whether the current trends will result in a change in radio performance 146. If the radio will be impaired, the process controller 113 adjusts the scheduler 132 in traffic Management 112 to reduce/increase the amount of traffic 150 supplied to radio controller 120.

If the current trends have not resulted in a change radio performance, the service provider still may want to change the amount of traffic traversing the link. To implement this, the process controller 113 retrieves the radio impairment policy 147 from persistent Storage 114. The Process Controller compares the current trends against the policy 148. If this is not considered a change radio performance 149, the process ends 151. If this is considered a change radio performance 149, the process controller 113 adjusts the scheduler 132 in Traffic management 112 to reduce/increase 150 the amount of traffic supplied to radio controller 120.

The effect of a reduction in the scheduler transmission may cause the queues 130 or 131 to grow. This can result in the execution of different local mechanisms such as priority discards, random early discards. It can also tie to end-to-end mechanisms such as flow control to reduce the rate of transmission at the source of the traffic. The degradation can also reach a level where process controller 113 triggers a protection switching on some of the traffic going on the degraded link.

The effect of an increase in the scheduler transmission may cause the queues 130 or 131 to empty thus underutilizing the link. This phenomena can tie to an end-to-end mechanisms such as flow control to increase the rate of transmission at the source of the traffic.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of making connections in a telecommunications system that includes a network for transporting communications between selected subscriber connections, and a wireless network for coupling connections to said network, said method comprising interfacing said network and said wireless network with a traffic management element and at least one radio controller shared by connections, said traffic management element and said radio controller forming a single integrated network element, routing connections from said wireless network to said network via said single integrated network element, and conveying information relating to the status of said wireless network to said traffic management element to permit evaluation of performance changes in said wireless network and effecting corresponding adjustments of the transmission rate between said network and said wireless network.

2. The method of claim 1 wherein said adjustments are effected to avoid losses in said communications transported between said network and said wireless network.

3. The method of claim 1 which includes buffering traffic before transporting it to said wireless network when the transmission speed in said wireless network is reduced.

* * * * *